United States Patent
Hsieh et al.

(10) Patent No.: US 6,466,645 B1
(45) Date of Patent: Oct. 15, 2002

(54) METHODS AND APPARATUS FOR TUBE-SPIT CORRECTION

(75) Inventors: Jiang Hsieh, Brookfield, WI (US); Jonathan R. Schmidt, Wales, WI (US); Clarence L. Gordon, III, Delafield, WI (US); Joseph L. Block, South Milwaukee, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/721,320

(22) Filed: Nov. 22, 2000

(51) Int. Cl.[7] ................................................. H65G 1/26
(52) U.S. Cl. ........................... 378/101; 378/19; 378/901
(58) Field of Search ............................... 378/4, 19, 901, 378/101, 116, 117, 118

(56) References Cited

U.S. PATENT DOCUMENTS

| | | | |
|---|---|---|---|
| 5,400,385 A | * | 3/1995 | Blake et al. ................. 378/110 |
| 5,400,387 A | * | 3/1995 | Gard et al. .................. 378/111 |
| 5,420,781 A | * | 5/1995 | Schmidt ........................ 363/98 |
| 5,528,043 A | | 6/1996 | Spivey et al. |
| 5,886,353 A | | 3/1999 | Spivey et al. |
| 6,025,585 A | | 2/2000 | Holland |
| 6,212,256 B1 | | 4/2001 | Miesbauer et al. |

* cited by examiner

*Primary Examiner*—Drew A. Dunn
(74) *Attorney, Agent, or Firm*—Carl B. Horton, Esq.; Armstrong Teasdale LLP

(57) ABSTRACT

In one aspect, the present invention relates to tube-spit detection and correction. In an exemplary embodiment, and once a sample of projection data has been collected, the projection data is preprocessed in accordance with known preprocessing algorithms including applying a detector primary speed correction to the projection data. Such primary speed correction removes contamination of previous signal sample from the current sample. After primary speed correction, tube-spit detection is performed on the sample. Such detection can be performed using many different methods. Generally, the objective is to determine whether the x-ray source experienced a drop in power. If a tube-spit event is not detected, then processing proceeds with further preprocessing and image reconstruction. If a tube-spit event is detected, then a tube spit correction is performed. Generally, the objective of tube-spit correction is to remove image artifacts due to the occurrence of a tube-spit event. Many different methods can be utilized to perform tube-spit correction.

20 Claims, 4 Drawing Sheets

METHODS AND APPARATUS FOR TUBE-SPIT CORRECTION

BACKGROUND OF THE INVENTION

This invention relates generally to methods and apparatus for CT imaging and other radiation imaging systems, and more particularly to detecting and correcting data for tube-spit events.

In at least some computed tomography (CT) imaging system configurations, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. X-ray sources typically include x-ray tubes, which emit the x-ray beam at a focal spot. X-ray detectors typically include a collimator for collimating x-ray beams received at the detector, a scintillator adjacent the collimator, and photodetectors adjacent the scintillator.

The term "tube-spit" refers to temporary electrical short-circuit that sometimes occurs inside an x-ray tube. Typically, upon the occurrence of tube-spit, the supply of power to the x-ray tube is temporarily interrupted to prevent arcing. Power is restored to the tube after a time interval of, for example, about one millisecond. During tube-spit recovery, no x-ray photon is emitted from the x-ray tube. As a result, the detector measurements taken during the recovery are invalid.

Generally, tube-spit recover time should be shorter than the data acquisition sampling interval to avoid image artifacts. As data sampling rates increase, a recovery time of about one millisecond is too long to avoid artifact generation.

BRIEF SUMMARY OF THE INVENTION

In one aspect, the present invention relates to tube-spit detection and correction that can be performed utilizing software processing rather than increasing demands on hardware by reducing the time interval between switching power to the x-ray tube off and on. In one exemplary embodiment, and once a sample of projection data has been collected, the projection data is preprocessed in accordance with known preprocessing algorithms including applying a detector primary speed correction to the projection data. Such primary speed correction removes contamination of previous signal sample from the current sample.

After preprocessing, tube-spit detection is performed on the sample. Such detection can be performed using many different methods. Generally, the objective is to determine whether the x-ray source experienced a drop in power. Specifically, upon the occurrence of a tube-spit event, signals on the entire detector should experience a significant drop since the x-ray tube output is reduced to nearly zero. Therefore, a tube-spit condition can be detected by determining whether the x-ray tube output was reduced to nearly zero for a period of time.

If a tube-spit event is not detected, then processing proceeds without tube spit correction. If a tube-spit event is detected, then a tube spit correction is performed. In addition, if a tube-spit event is detected, power is still interrupted to the x-ray tube. The tube-spit correction described herein, however, eliminates a need to increase demands on hardware by reducing the time interval between interrupting power to the x-ray tube as compared to the time interval described above, i.e., even with increased sampling rates, the time interval for interrupting power to the x-ray tube need not be reduced. Generally, the objective of tube-spit correction is to remove image artifacts due to the occurrence of a tube-spit event. Many different methods can be utilized to perform tube-spit correction.

DETAILED DESCRIPTION OF THE INVENTION

Figure 1:
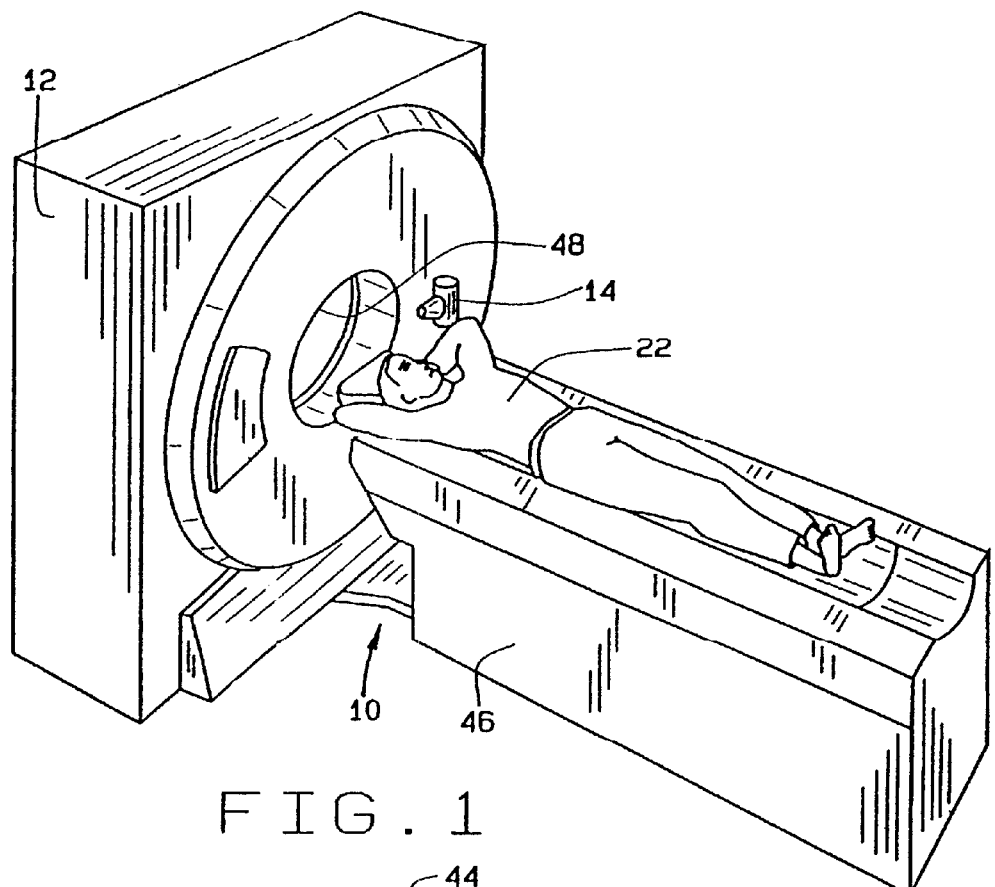
FIG. 1 is a pictorial view of a CT imaging system.
Figure 2:
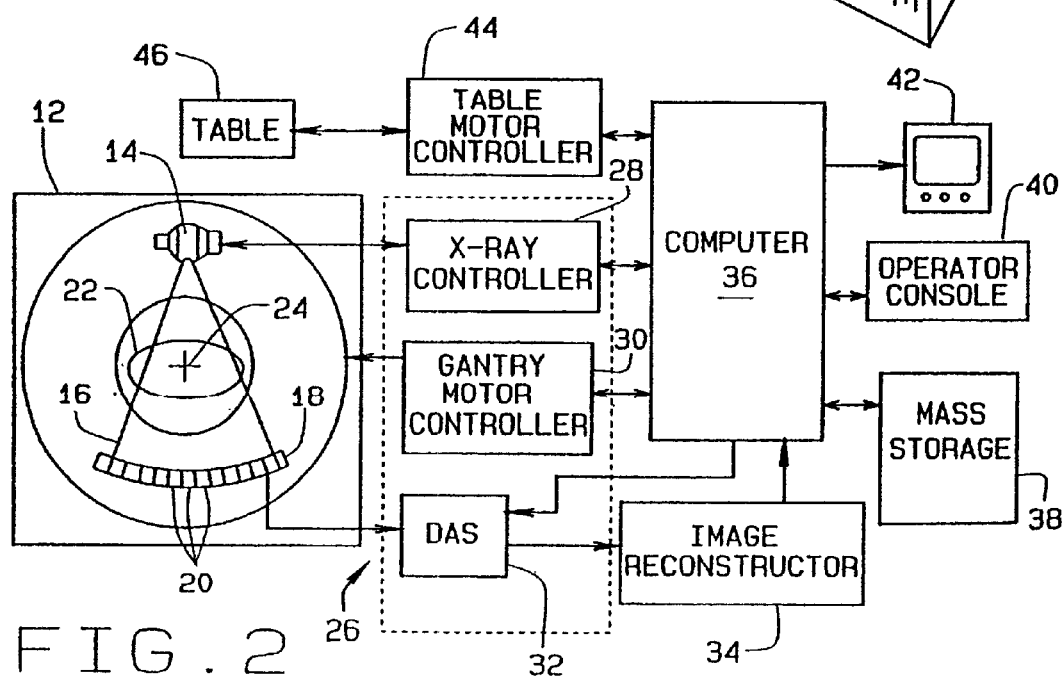
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object, such as a medical patient 22. Each detector element 20 produces an electrical signal that represents the intensity of an impinging x-ray beam and hence the attenuation of the beam as it passes through object or patient 22. During a scan to acquire x-ray projection data, gantry 12 and the components mounted thereon rotate about a center of rotation 24. In one embodiment, and as shown in FIG. 2, detector elements 20 are arranged in one row so that projection data corresponding to a single image slice is acquired during a scan. In another embodiment, detector elements 20 are arranged in a plurality of parallel rows, so that projection data corresponding to a plurality of parallel slices can be acquired simultaneously during a scan.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
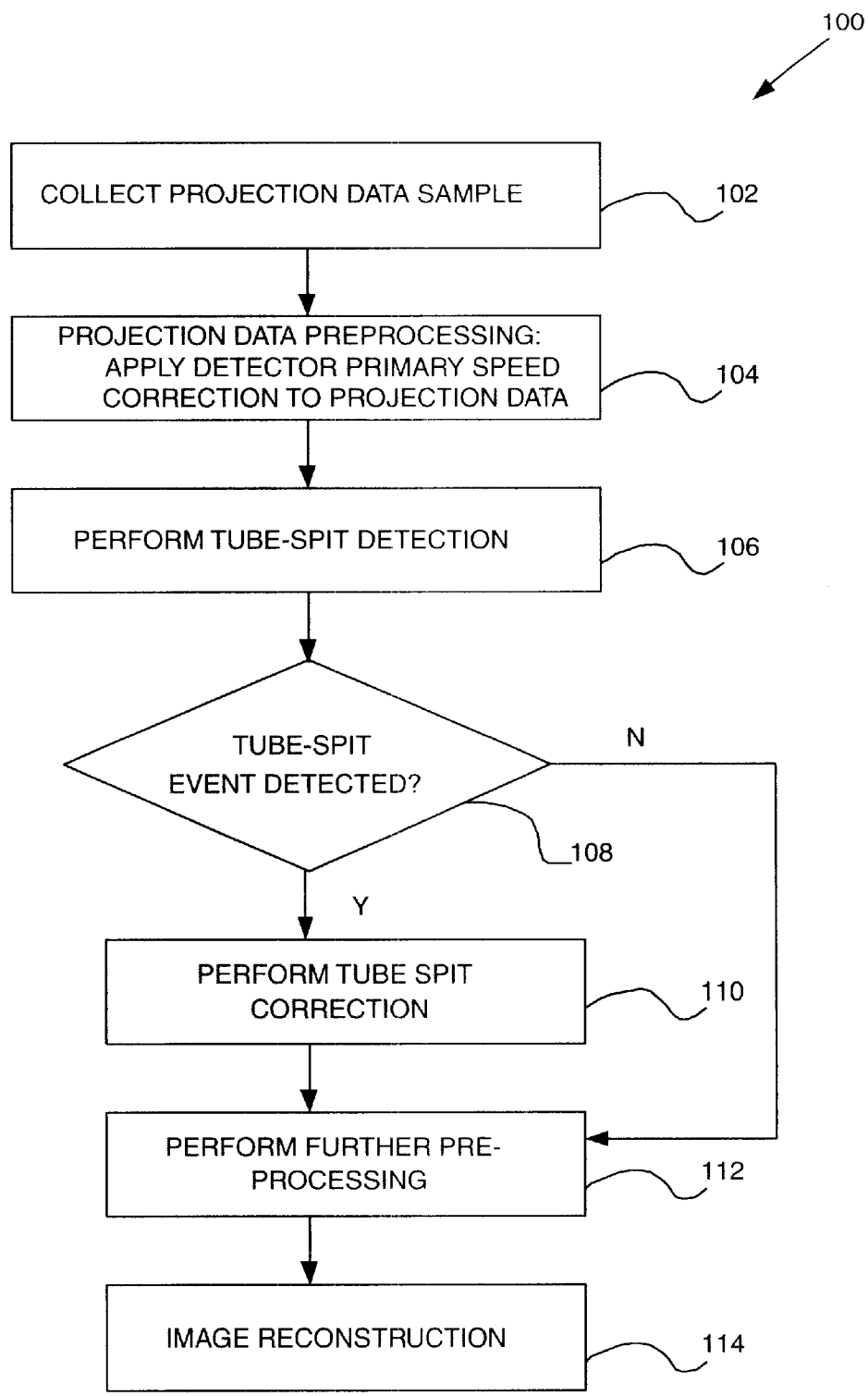
FIG. 3 is a flow chart illustrating tube-spit detection and correction processing.

FIG. 3 is a flow chart illustrating tube-spit detection and correction processing 100 in accordance with one embodiment of the present invention. Such detection and correction are performed, for example, by a processor in DAS 32, image reconstructor 34, or computer 36. Rather than increasing demands on hardware by reducing the timer interval between interrupting power to the x-ray tube and then re-energizing the tube during a recovery period, the detection and correction processing illustrated in FIG. 3 is performed utilizing software control processing. Therefore, the difficulties associated with hardware and speed limitations as described above are substantially, if not entirely, avoided and not dependent on the sampling rate of DAS 32.

Referring specifically to FIG. 3, and once a sample of projection data has been collected 102, the projection data is preprocessed in accordance with known preprocessing algorithms including applying a detector primary speed correction to the projection data 104. Such primary speed correction removes contamination of previous signal sample from the current sample.

After selected steps of preprocessing, tube-spit detection is performed 106 on the sample. Such detection can be performed using many different methods, and one specific method is described below in more detail. Generally, the objective is to determine whether the x-ray source experienced a drop in power. Specifically, upon the occurrence of a tube-spit event, signals on the entire detector should experience a significant drop since the x-ray tube output is reduced to nearly zero. Therefore, a tube-spit condition can be detected by determining whether the x-ray tube output was reduced to nearly zero for a period of time.

If a tube-spit event is detected, then a tube spit correction is performed 110. Generally, the objective is to remove image artifacts due to the occurrence of a tube-spit event. Although many different methods can be utilized to perform tube spit correction, a specific method for performing tube spit correction is described below. After performing tube spit correction 110, or if a tube-spit event is not detected 108, then further preprocessing 112 and image reconstruction 114 are performed.

Figure 4:
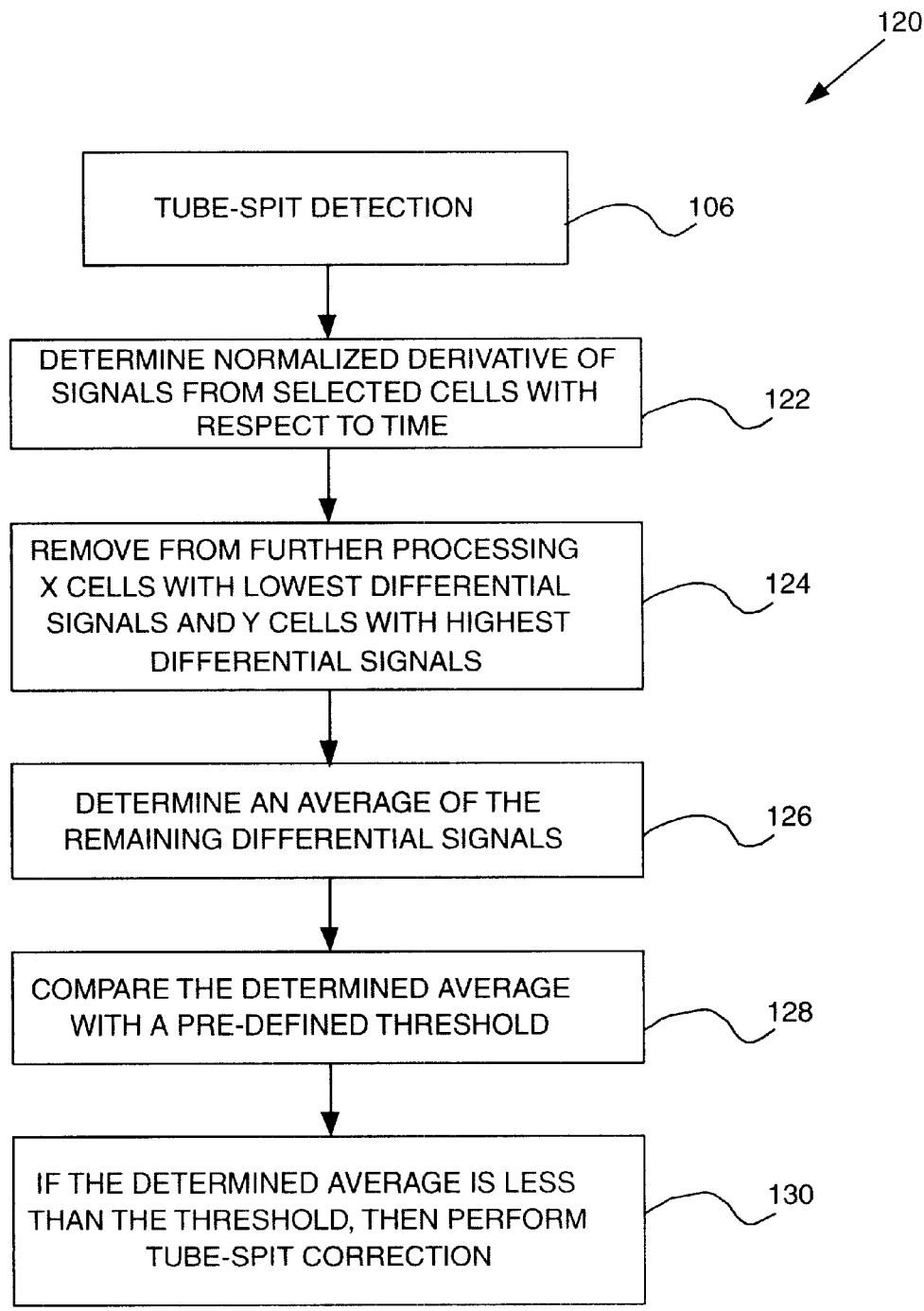
FIG. 4 is a flow chart illustrating tube-spit detection processing.

FIG. 4 is a flow chart illustrating an exemplary method for tube-spit detection processing 120. As explained above, many alternative methods can be used for such detection, including by measuring the current or voltage of the power supply to the x-ray tube. Sudden changes in either such current or voltage measurement is an indication of a tube-spit event.

In the exemplary embodiment illustrated in FIG. 4, and for tube-spit detection 106, a normalized derivative of signals from selected cells with respect to time is determined 122. To reduce the amount of processing required for the detection, only selected detector cells that are spaced sparsely are utilized as the input cells. For example, in a known detector, each row of the detector has 888 channels along the arc. Signals from every $35^{th}$ detector cell are selected for use in tube-spit detection. The cells are not necessarily located on the same detector row.

The derivative of a signal has the property of enhancing signal changes. A normalized derivative is generally insensitive to the absolute signal level. Since the detector cells at different locations will see x-ray flux blocked by different parts of the patient, the signal level is likely to vary significantly from channel to channel. The derivative signals can be approximated by the differential signals of adjacent samples. Of course, other derivative operators can also be used. In one embodiment, the normalized differential signal can be calculated by:

$$D_{ij}(k) = \frac{P_{ij}(k-1) - P_{ij}(k)}{P_{ij}(k-1)} \quad (1)$$

In this equation, $P_{ij}(k)$ represents the $k_{th}$ projection reading for detector cell number i in row j.

To avoid false positives caused by the temporary blockage of patient, the differential signals $D_{ij}$ can be sorted and a fraction of the readings from the high and low end dropped 124. For example, if 20 detector cells are used for the tube-spit detection, five cells that have the lowest differential signal and five cells with the highest differential signal can be dropped.

Next, an average of the remaining differential signals is determined 126 and compared against a pre-defined threshold 128. Because the differential signals are normalized to its previous reading, a single threshold can be used. For example, a threshold of 0.5 indicates the average signal of the selected cells falls below 50% of its previous level. If this occurs, a tube-spit event is declared and a tube-spit correction is performed 130.

Figure 5:
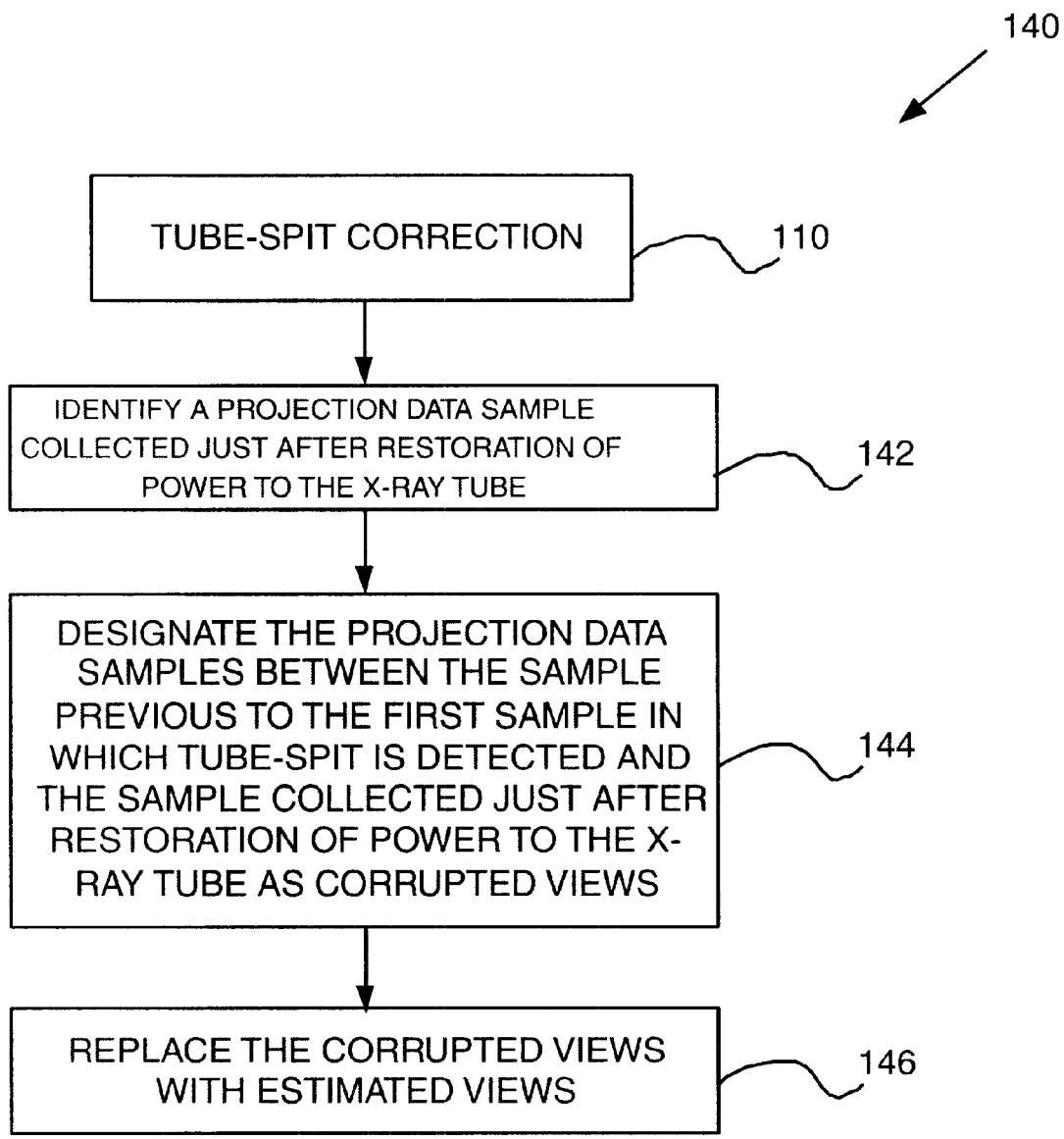
FIG. 5 is a flow chart illustrating tube-spit correction processing.

FIG. 5 is a flow chart illustrating an exemplary embodiment of tube-spit correction processing 140. Tube-spit correction 110 occurs after the successful detection of a spit event. In tube-spit correction processing, a projection data sample collected after the restoration of power to the x-ray tube is identified 142. To perform this task, a normalized differential signal between the previous view and the next view is determined in accordance with:

$$D_{ij}(k+n) = \frac{P_{ij}(k-1) - P_{ij}(k+n)}{P_{ij}(k-1)} \quad (2)$$

In this equation 2, n is initially set to 1. If the average differential signal is still below a predefined threshold, it indicates that the input x-ray flux has not been restored to the desired level. Therefore, the projection readings are not reliable. Then n is set equal to 2 and the process is repeated. This process continues until either the average differential signal is below the threshold or if n becomes large than a predefined threshold. In the first case, a view is successfully found that represents a valid projection measurement. In the later case, the tube-spit event is too severe and any correction is unlikely to yield reliable results. When such event occurs, a warning message is posted to the operator to repeat the scan, and service personal should be contacted for potential tube change.

Once a valid post-spit view has been located, the samples (or views) between the sample previous to the first sample in which tube-spit is detected and the sample collected just after restoration of power to the x-ray tube (i.e., the valid post-spit view) are designated as corrupted views 144. The corrupted views are then replaced by estimation based on the interpolation of the valid views 146. For better performance, high-order interpolation (e.g., LaGrange interpolator) can be used. For simplicity and speed, linear interpolation can be used. For linear interpolation, the following equation can be used:

$$P_{ij}(k+n) = \left(\frac{m-n}{m+1}\right)P_{ij}(k-1) + \left(\frac{n+1}{m+1}\right)P_{ij}(k+m) \quad 0 \le n < m \quad (3)$$

where k+m is the first valid view after the tube-spit.

The above described tube-spit detection and correction does not require increasing demands on hardware by reducing the time interval between interrupting power to the x-ray tube and then re-energizing the tube during a recovery period. Rather, the detection and correction processing is performed utilizing software control processing. Therefore, the difficulties associated with hardware and speed limitations as described above are substantially, if not entirely, avoided and not dependent on the sampling rate of the DAS.

While the invention has been described in terms of various specific embodiments, those skilled in the art will recognize that the invention can be practiced with modification within the spirit and scope of the claims.

What is claimed is:

1. A method comprising the steps of:
   collecting a plurality of data samples from a CT system detector array;
   determining whether a tube-spit event occurred using the collected data samples; and
   if a tube-spit event occurred, processing the samples to perform tube-spit correction.

2. A method in accordance with claim 1 wherein collecting the data samples comprises the step of operating a data acquisition system to scan the detector array.

3. A method in accordance with claim 1 wherein determining whether a tube-spit event occurred comprises the step of determining whether an x-ray output dropped about to zero.

4. A method in accordance with claim 1 wherein determining whether a tube-spit event occurred comprises the steps of determining a normalized derivative of signals from selected cells of the detector, determining an average of the differential signals, and comparing the differential signals average with a threshold.

5. A method in accordance with claim 4 further comprising the step of selecting at least some of the normalized derivative signals to not utilize in determining the differential signals processing.

6. A method in accordance with claim 4 wherein the normalized derivative is determined in accordance with:

$$D_{ij}(k) = \frac{P_{ij}(k-1) - P_{ij}(k)}{P_{ij}(k-1)}$$

where $P_{ij}(k)$ represents a $k_{th}$ projection reading for detector cell number i in row j.

7. A method in accordance with claim 1 wherein processing the sample to perform tube-spit correction comprises removing image artifacts due to the occurrence of a tube-spit event.

8. A method in accordance with claim 1 wherein processing the samples to perform tube-spit correction comprises identifying a sample collected just after restoration of power to the x-ray tube, designating samples between the sample previous to the sample in which tube-spit is detected and the sample collected just after restoration of power to the x-ray tube as corrupted views, and replacing the corrupted views with estimated views.

9. A method in accordance with claim 8 wherein the corrupted views are then replaced by estimation based on an interpolation of valid views.

10. A method in accordance with claim 9 wherein the interpolation is performed in accordance with at least one of a high-order interpolation and linear interpolation.

11. A method in accordance with claim 9 wherein the interpolation is performed in accordance with:

$$P_{ij}(k+n) = \left(\frac{m-n}{m+1}\right)P_{ij}(k-1) + \left(\frac{n+1}{m+1}\right)P_{ij}(k+m) \quad 0 \leq n < m$$

where k+m is the first valid view after the tube-spit.

12. A method in accordance with claim 1 wherein processing the samples to perform tube-spit correction comprises identifying a projection data sample collected after the restoration of power to the x-ray tube, and wherein identifying the data sample comprises the step of generating a normalized differential signal between a previous view and a next view determined in accordance with:

$$D_{ij}(k+n) = \frac{P_{ij}(k-1) - P_{ij}(k+n)}{P_{ij}(k-1)}.$$

13. A method in accordance with claim 12 wherein processing the samples to perform tube-spit correction further comprises the step of comparing the differential signal with a predefined threshold.

14. A processor programmed to:
   determine whether a tube-spit event occurred using a plurality of data samples collected from a detector array; and
   process the samples to perform tube-spit correction if a tube-spit event is determined to have occurred.

15. A processor in accordance with claim 14 wherein to determine whether a tube-spit event occurred, said processor is programmed to determine a normalized derivative of signals from selected cells of the detector, determine an average of selected differential signals, and compare the differential signals average with a threshold.

16. A processor in accordance with claim 15 wherein said normalized derivative is determined in accordance with:

$$D_{ij}(k) = \frac{P_{ij}(k-1) - P_{ij}(k)}{P_{ij}(k-1)} \quad (1)$$

where $P_{ij}(k)$ represents a $k_{th}$ projection reading for detector cell number i in row j.

17. A processor in accordance with claim 14 wherein to perform tube-spit correction, said processor is programmed to identify a sample collected just after restoration of power to the x-ray tube, designate samples between the sample previous to the sample in which tube-spit is detected and the sample collected just after restoration of power to the x-ray tube as corrupted views, and replace the corrupted views with estimated views.

18. A processor in accordance with claim 17 further programmed to replace said corrupted views with estimated views.

19. A processor in accordance with claim 18 wherein said processor is programmed to generate said estimated views based on interpolation performed in accordance with at least one of a high-order interpolation and linear interpolation.

20. A processor in accordance with claim 14 wherein to perform tube-spit correction, said processor is programmed to identify a projection data sample collected after the restoration of power to the x-ray tube, and wherein to identify the data sample said processor is programmed to generate a normalized differential signal between a previous view and a next view determined in accordance with:

$$D_{ij}(k+n) = \frac{P_{ij}(k-1) - P_{ij}(k+n)}{P_{ij}(k-1)}.$$

* * * * *